（12）United States Patent
Yokota (10) Patent No.: US 9,507,205 B2
(45) Date of Patent: Nov. 29, 2016

(54) DISPLAY DEVICE AND TELEVISION RECEIVER

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 588 days.

(21) Appl. No.: 13/377,233

(22) PCT Filed: Apr. 21, 2010

(86) PCT No.: PCT/JP2010/057038
§ 371 (c)(1),
(2), (4) Date: Dec. 9, 2011

(87) PCT Pub. No.: WO2010/146931
PCT Pub. Date: Dec. 23, 2010

(65) Prior Publication Data
US 2012/0081351 A1 Apr. 5, 2012

(30) Foreign Application Priority Data
Jun. 17, 2009 (JP) ................................. 2009-144350

(51) Int. Cl.
*H04N 5/64* (2006.01)
*G02F 1/1335* (2006.01)
*G02F 1/1333* (2006.01)

(52) U.S. Cl.
CPC .......... *G02F 1/133608* (2013.01); *H04N 5/64* (2013.01); *G02F 1/133606* (2013.01);
(Continued)

(58) Field of Classification Search
CPC ................. H04N 5/64; G02F 1/133608; G02F 1/133606; G02F 2001/133317; G02F 2001/133322; G02F 2001/13332
(Continued)

(56) References Cited

U.S. PATENT DOCUMENTS

2008/0192168 A1* 8/2008 Sudo ................. G02F 1/133308
349/58
2009/0027584 A1 1/2009 Han et al.
(Continued)

FOREIGN PATENT DOCUMENTS

CN 101149529 A 3/2008
CN 101354496 A 1/2009
(Continued)

OTHER PUBLICATIONS

Official Communication issued in International Patent Application No. PCT/JP2010/057038, mailed on Aug. 3, 2010.
(Continued)

*Primary Examiner* — Michael Caley
*Assistant Examiner* — Angela Davison
(74) *Attorney, Agent, or Firm* — Keating & Bennett, LLP (57) ABSTRACT

A display device includes a first cabinet to which a display panel is attached and a second cabinet to which a light source is attached. The first cabinet and the second cabinet are assembled with an optical member, which diffuses light from the light source, held between the cabinets. The optical member includes a first optical member having relatively large weight and a second optical member having relatively small weight. The first optical member is pressed by the top of a projection provided in at least one of the first cabinet and the second cabinet.

9 Claims, 13 Drawing Sheets

(52) U.S. Cl.
 CPC .............. *G02F 2001/133317* (2013.01); *G02F 2001/133322* (2013.01)

(58) Field of Classification Search
 USPC .......................................................... 349/58
 See application file for complete search history.

(56) References Cited

U.S. PATENT DOCUMENTS

| | | | |
|---|---|---|---|
| 2009/0051845 A1* | 2/2009 | Tsuchiyama | G02F 1/133308 349/58 |
| 2009/0066874 A1* | 3/2009 | Tsumura | G02F 1/133604 349/58 |
| 2009/0116246 A1 | 5/2009 | Lu et al. | |
| 2009/0135330 A1* | 5/2009 | Kawase | G02F 1/133603 349/58 |

FOREIGN PATENT DOCUMENTS

| | | |
|---|---|---|
| CN | 101382702 A | 3/2009 |
| JP | 8-298389 A | 11/1996 |
| JP | 2001-290134 A | 10/2001 |
| JP | 2008-197166 A | 8/2008 |
| JP | 2008-293711 A | 12/2008 |

OTHER PUBLICATIONS

Yokota, "Display Device and Television Receiver", U.S. Appl. No. 13/377,234, filed Dec. 9, 2011.
Yokota, "Lighting Device, Display Device, Television Receiver", U. S. Appl. No. 13/377,235, filed Dec. 9, 2011.
Yokota, "Display Device and Television Receiver", U.S. Appl. No. 13/377,238, filed Dec. 9, 2011.

* cited by examiner

DISPLAY DEVICE AND TELEVISION RECEIVER

TECHNICAL FIELD

The present invention relates to a display device and a television receiver.

BACKGROUND ART

For example, a liquid crystal panel used for a liquid crystal display device such as a liquid crystal television does not spontaneously emit light. Therefore, a backlight is separately required as an illumination device. A liquid crystal display device described in Patent Literature 1 has a configuration in which a backlight includes a chassis that houses plural cold-cathode tubes and a frame for aligning an optical member in the chassis and the backlight and a liquid crystal panel are maintained in an assembled state by a bezel that covers the liquid crystal panel from the front side. The liquid crystal display device is held between both front and rear cabinets to configure a television receiver. In other words, as clearly indicated in Patent Literature 1, the liquid crystal panel and the backlight are separately manufactured and assembled with each other using the bezel or the like to manufacture the liquid crystal display device. The liquid crystal display device is held between a pair of cabinets to manufacture a television receiver.

PRIOR ART DOCUMENT

Patent Document

Patent Document 1: Japanese Unexamined Patent Application Publication No. 2008-293711

Problem to be Solved by the Invention

In the technique of Patent Literature 1, the liquid crystal panel and the backlight are separately manufactured, assembled in a separate process, and housed in the cabinets in another separate process to configure the television receiver. However, such a method is not always an efficient method because the number of processes increases.

In the technique of Patent Literature 1, the liquid crystal panel is assembled to the backlight by the bezel. However, for example, when the liquid crystal panel is directly placed on the backlight and then assembled by the bezel, if a portion where the liquid crystal panel is placed is secured wide, an effective display region of the liquid crystal panel is reduced. Therefore, it is necessary to secure the placing portion narrow. However, placing the liquid crystal panel in the narrow portion has a problem in that workability is low compared with placing the liquid crystal panel in the wide portion.

Further, as in the technique of Patent Literature 1, the optical member such as a diffuser is held by a holding member such as a frame or a holder and aligned and fixed. However, since the optical member such as the diffuser is made of resin, if an end is fixed as explained above, in some cases, creases are formed and a display failure occurs because of the influence of heat generation based on lighting of the cold-cathode tubes. On the other hand, the optical member such as the diffuser swings if not fixed. In some cases, the optical member is scratched because of the swing.

DISCLOSURE OF THE PRESENT INVENTION

The present invention has been devised in view of the above problems and it is an object of the present invention to provide a display device that can be provided as a final product such as a television receiver simply by assembling a display panel (a component including a panel) and a backlight (a component including a light source) and is excellent in workability in assembling the panel to the backlight and can prevent or suppress scratches due to swing or the like of an optical member. It is also an object of the present invention to provide a television receiver including such a display device.

Means for Solving the Problem

In order to solve the problems, a display device according to the present invention includes a light source, a display panel, a first cabinet, and a second cabinet. The display panel is configured to provide display using light of the light source. The display panel is attached to the first cabinet. The light source is attached to the second cabinet. The first cabinet and the second cabinet are assembled with an optical member held between the cabinets. The optical member includes a first optical member having relatively large weight and a second optical member having relatively small weight. The first optical member is pressed by the top of a projection provided in at least one of the first cabinet and the second cabinet.

According to such a display device, the display panel is attached to the first cabinet and the light source is attached to the second cabinet. Therefore, a display function of the display panel using the light from the light source can be implemented by assembling the cabinets. Concerning the optical member held between the first cabinet and the second cabinet, since the first optical member having relatively large weight is pressed by the top of the projection provided in the cabinet, a deficiency of swinging of the first optical member having large weight less easily occurs. Therefore, friction between the first optical member and another member due to the swing less easily occurs. Consequently, a deficiency such as scratches due to the friction less easily occurs. In particular, since the first optical member is pressed by the top of the projection, an area of a pressed portion is small. Therefore, there is a degree of freedom in expansion and contraction (thermal expansion) due to heat generation from the light source and the like. A deficiency such as formation of creases also less easily occurs.

MODE FOR CARRYING OUT THE INVENTION

First Embodiment

A first embodiment embodying the present invention is explained with reference to the drawings.

Figure 1:
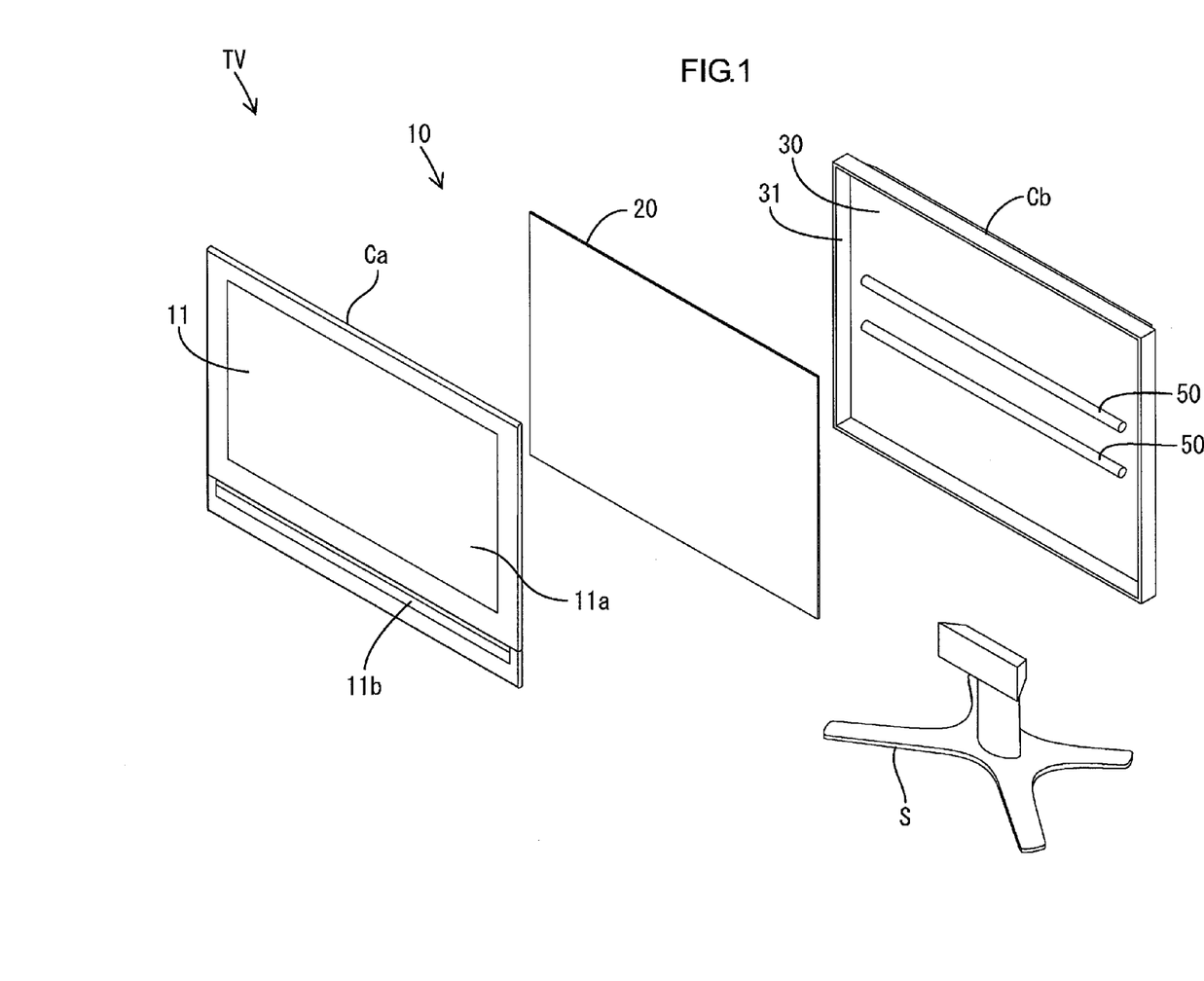
FIG. 1 is a disassembled perspective view showing a schematic configuration of a television receiver according to a first embodiment of the present invention.

A television receiver TV shown in FIG. 1 includes a liquid crystal display device 10, a stand S for placing the liquid crystal display device 10, a not-shown power supply, and a not-shown tuner.

The liquid crystal display device (a display device) 10 is formed in a square shape long in sideways as a whole and supported by the stand S in an upright state. Specifically, the exterior of the liquid crystal display device 10 is configured by a first cabinet Ca and a second cabinet Cb having a lateral rectangular shape. The first cabinet Ca and the second cabinet Cb are engaged to configure an outer case of the liquid crystal display device 10.

The first cabinet Ca is formed of a frame-like resin member. A liquid crystal panel (the display panel) 11 is attached to the first cabinet Ca to be housed in the frame. A display surface 11a of the liquid crystal panel 11 is arranged in the frame. A speaker 11b and the like are provided on the surface side of the first cabinet Ca. On the other hand, the second cabinet Cb is formed of a box-like resin member having an opening and includes a bottom surface 30 that forms a box bottom and a wall section 31 vertically provided from the bottom surface 30. Hot-cathode tubes 50 are attached to the bottom surface 30.

Figure 2:
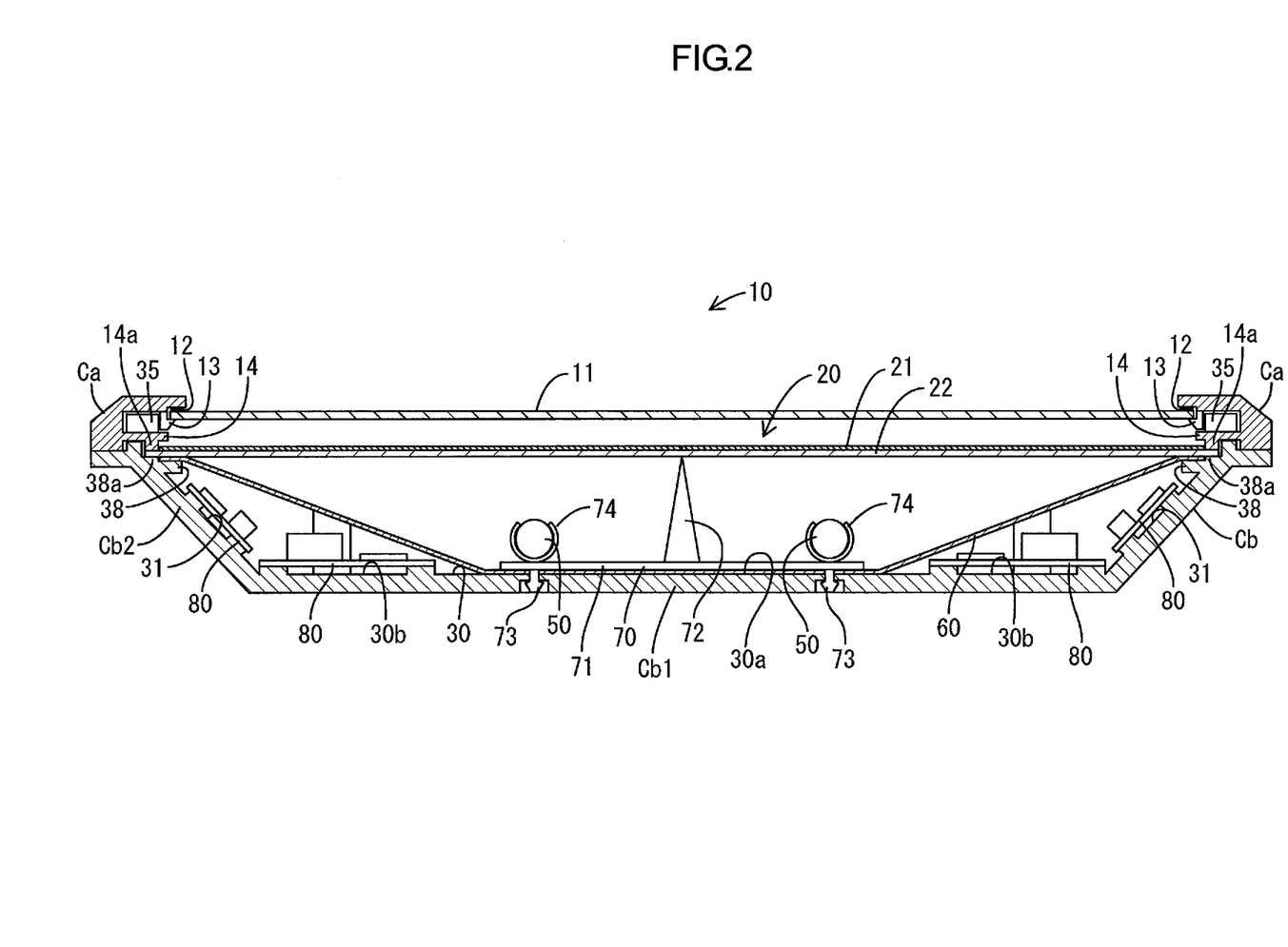
FIG. 2 is a sectional schematic view showing the configuration of a liquid crystal display device included in the television receiver shown in FIG. 1.

The liquid crystal display device 10 has a configuration in which the second cabinet Cb is attached on the opposite side of the display surface 11a of the liquid crystal panel 11 with respect to the first cabinet Ca and light is supplied from the hot-cathode tubes 50 of the second cabinet Cb to the liquid crystal panel 11. An optical member 20 such as a diffuser is arranged between the first cabinet Ca and the second cabinet Cb, specifically, between the liquid crystal panel 11 and the hot-cathode tubes 50 and diffuses the light from the hot-cathode tubes 50 in a planar shape.

The liquid crystal panel 11 has a configuration in which a pair of glass substrates are bonded with a predetermined gap apart from each other and liquid crystal is filled between the glass substrates. On one glass substrate, a switching element (e.g., TFT) connected to a source wire and a gate wire orthogonal to each other, a pixel electrode connected to the switching element, an oriented film, and the like are provided. On the other glass substrate, a color filter on which colored sections of R (red), G (green), B (blue), and the like are arranged in a predetermined array, a counter electrode, an oriented film, and the like are provided. Sheet polarizers are arranged on the outer sides of both the substrates. As shown in FIG. 2, the optical member 20 includes a diffuser 22 having relatively large weight and large thickness on the second cabinet Cb side and include a diffusing lens and an optical sheet 21 such as a reflective polarizing sheet having relatively small weight and small thickness on the first cabinet Ca side.

The configuration of the first cabinet Ca and the second cabinet Cb and assembling of the first cabinet Ca and the second cabinet Cb are explained.

Figure 3:
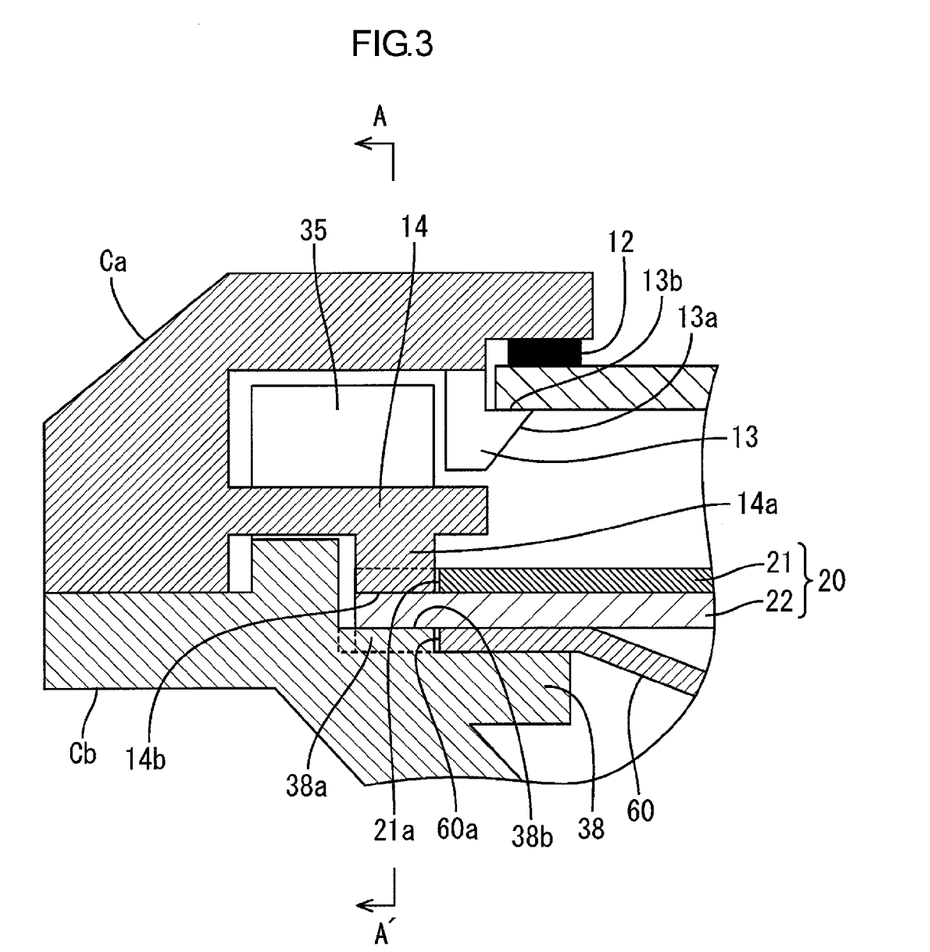
FIG. 3 is a sectional schematic view showing an assembling portion of a first cabinet and a second cabinet or an attaching portion of an optical member in FIG. 2 in enlargement.
Figure 4:
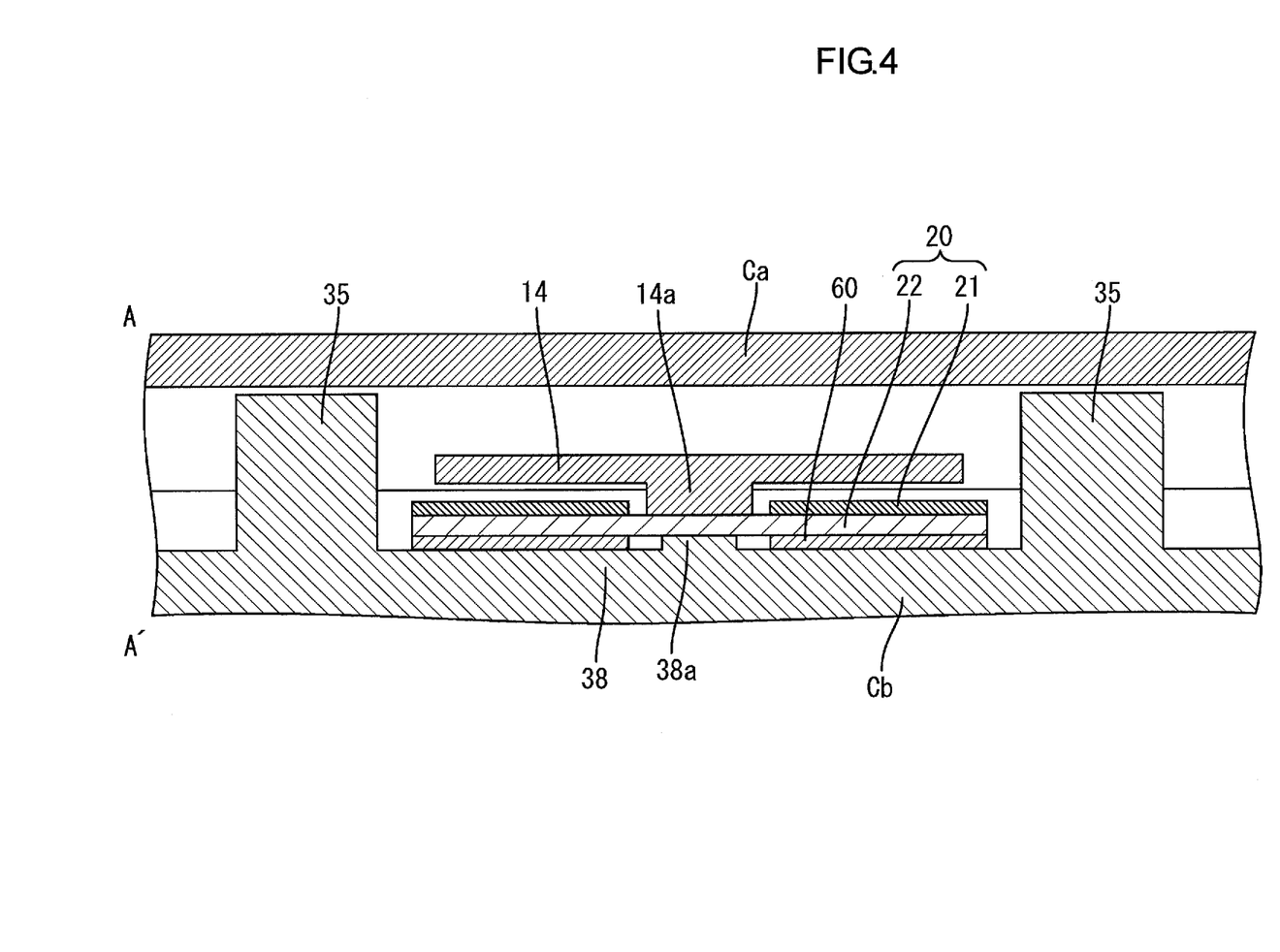
FIG. 4 is a sectional schematic view showing the configuration of a cross section taken along A-A' line shown in FIG. 3.
Figure 7:
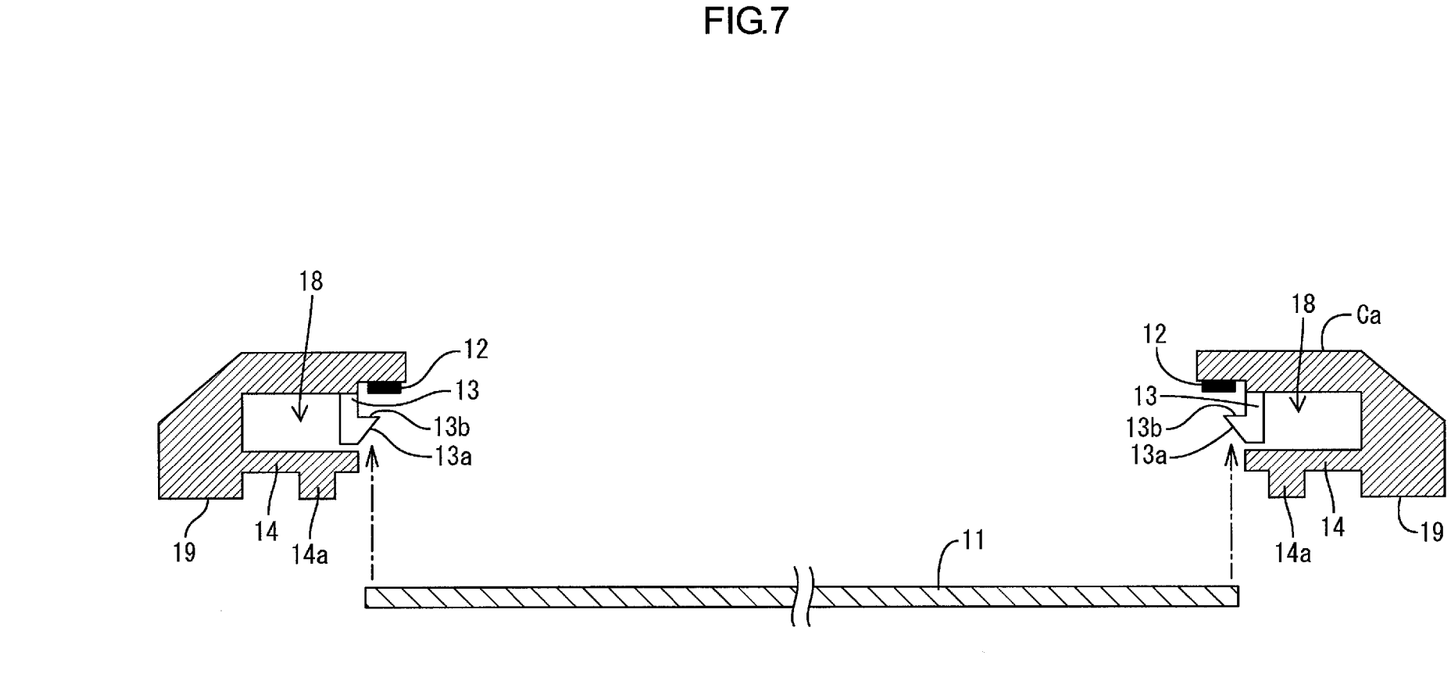
FIG. 7 is a schematic view showing a form of attaching the liquid crystal panel to the first cabinet in the first embodiment.

As shown in FIG. 2, the first cabinet Ca includes a claw section 13 for locking the liquid crystal panel 11. As shown in FIG. 3, the claw section 13 includes a locking surface 13b. The claw section 13 holds the liquid crystal panel 11 between the locking surface 13b and an elastic member (such as PORON®) 12 arranged to be opposed to the locking surface 13b. The claw section 13 itself is elastically deformable. As shown in FIG. 7, the claw section 13 is configured to be elastically deformed in a direction in which the claw section 13 widens (to the outer side) when the liquid crystal panel 11 is attached to the first cabinet Ca and elastically deformed in a direction in which the liquid crystal panel 11 is tightened (to the inner side) after the liquid crystal panel 11 is attached (details are explained later).

A slope 13a is provided in the claw section 13 of the first cabinet Ca to make it possible to, while guiding the liquid crystal panel 11 in a pressing direction (an arrow direction in FIG. 7), elastically deform the claw section 13 according to the pressing when the liquid crystal panel 11 is housed in the locking surface 13b of the claw section 13. On the rear side of the claw section 13, i.e., on the opposite side of a side where the liquid crystal panel 11 is locked, a projection housing section 18 for housing a projection for claw section regulation 35 of the second cabinet Cb explained later is formed (see FIG. 7).

Figure 6:
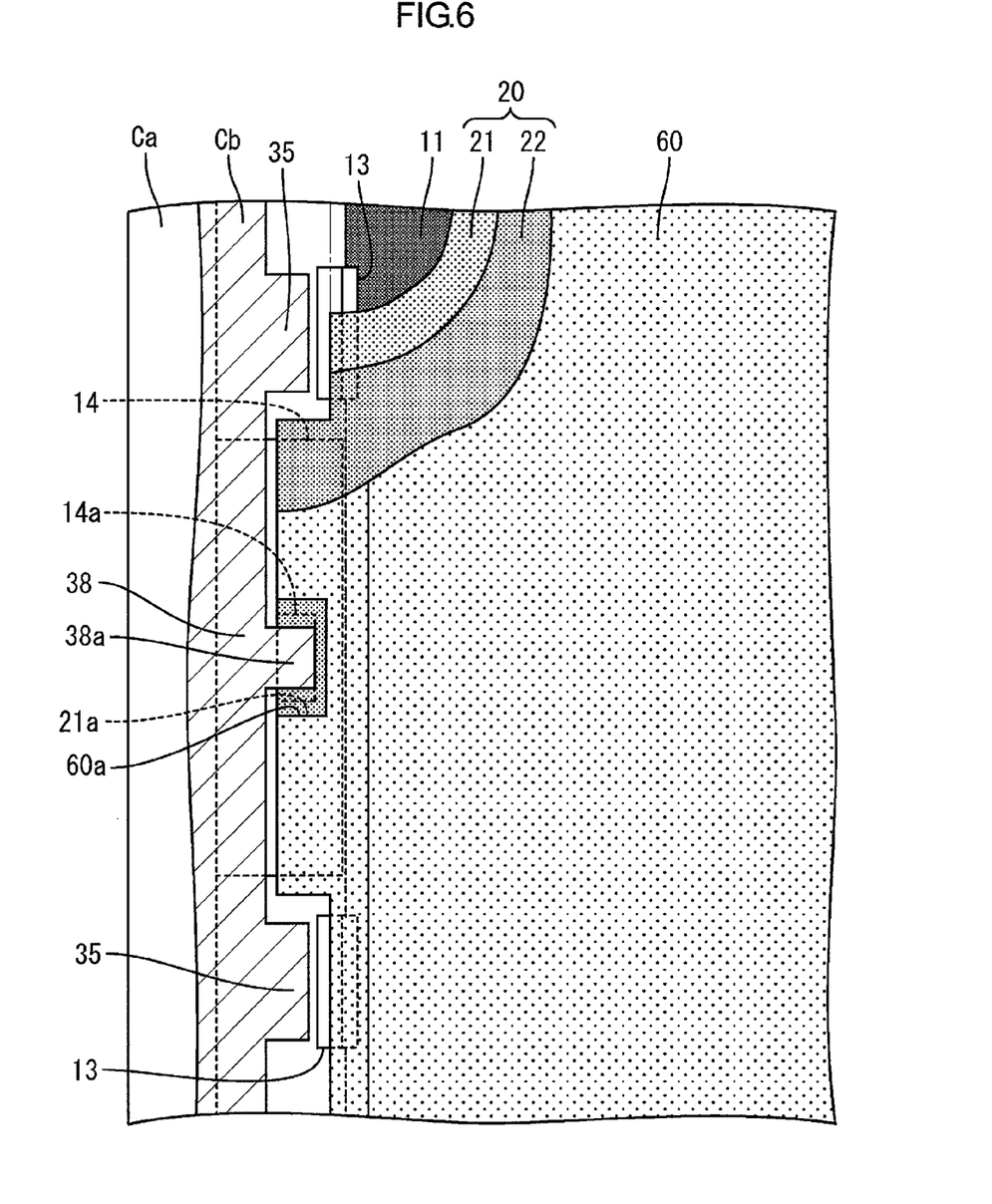
FIG. 6 is a plan schematic view showing an assembly relation among a liquid crystal panel, the optical member, a reflection sheet, and the like in FIG. 2.

In the first cabinet Ca, a piece for holding (a first member for holding) 14 for holding the optical member 20 is formed. Plural pieces for holding 14 are formed in the same plane. The pieces for holding 14, 14 and claw sections 13, 13 are arranged such that the claw section 13 is located between the adjacent pieces for holding 14, 14 in plan view (see FIG. 6). In other words, the piece for holding 14 and the claw section 13 are arranged not to overlap each other in plan view.

Figure 5:
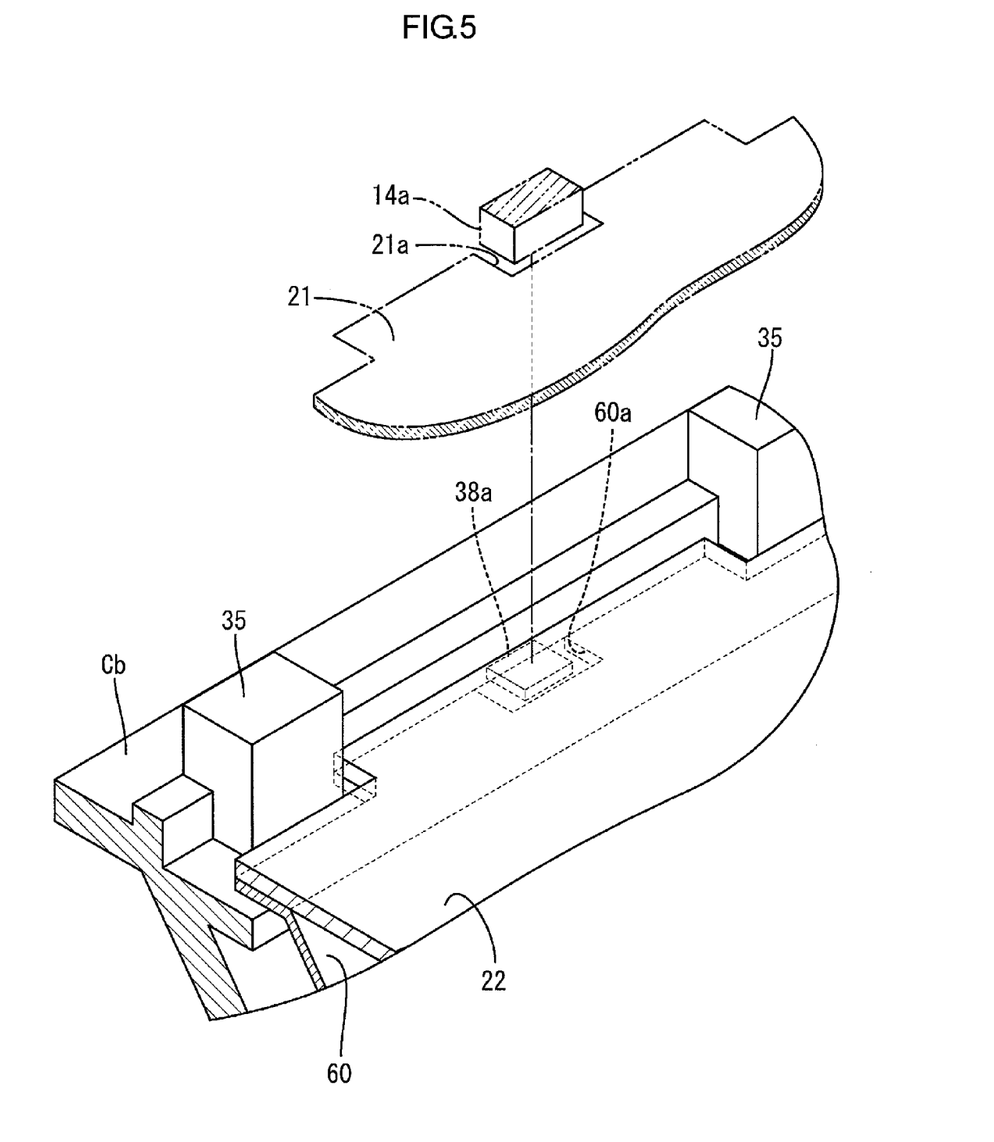
FIG. 5 is a perspective view showing the attaching portion of the optical member in FIG. 2 in enlargement.

The piece for holding 14 holds the optical member 20 and a reflection sheet 60 between the piece for holding 14 and a piece for holding 38 (a second member for holding) provided in the second cabinet Cb. In particular, a projection 14a projecting to the second cabinet Cb side is formed in the piece for holding 14. The piece for holding 14 is configured to press only the diffuser 22 in the optical member 20 at a top surface (a top) 14b of the projection (a first projection) 14a. In other words, in the optical sheet 21 arranged further on the piece for holding 14 side than the diffuser 22, a cutout 21a having a shape that is not pressed by the projection 14a and avoids the projection 14a to detour is formed (see FIGS. 5 and 6).

On the other hand, as shown in FIG. 2, the second cabinet Cb includes a bottom plate Cb1 that forms the bottom surface 30 and a wall plate Cb1 that forms the wall section 31. The wall section 31 is arranged to tilt at a predetermined angle with respect to the bottom surface 30.

In the bottom plate Cb1, two hot-cathode tubes 50 are attached on the bottom surface 30 thereof via a lamp clip 70. The reflection sheet 60 for reflecting light emitted from the hot-cathode tubes 50 to the inner surface of the second cabinet Cb is laid on the bottom surface 30. The hot-cathode tubes 50 are formed as a liner light source assuming a slender tube shape. The hot-cathode tubes 50 are arranged on the bottom surface 30 in a state in which a length direction (an axial direction) thereof is matched with a long side direction of the second cabinet Cb and the two hot-cathode tubes 50 are arranged in parallel to each other.

The reflection sheet 60 is made of synthetic resin. The surface of the reflection sheet 60 is colored in white excellent in light reflection properties. The reflection sheet 60 is laid to cover substantially the entire region of the inner surface of the second cabinet Cb along the inner surface. Specifically, in addition to a bottom section laid along the bottom surface 30, the reflection sheet 60 includes a tilting section tilting to extend along the wall section 31 (an angle of which is slightly different from the angle of the wall section 31). The reflection sheet 60 can orient light reflected by the tilting section to the inner side (the center side of the display device). A circuit board 80 such as a driving power supply board for supplying driving power to the hot-cathode tubes 50 is arranged in a region 30b different from a region 30a where the hot-cathode tubes 50 are arranged in the bottom surface 30 of the bottom plate Cb1.

The lamp clip 70 includes a plate section 71 applied to the bottom surface 30 of the bottom plate Cb1, a support pin 72 that projects from the plate section 71 to the optical member 20 side and supports the optical member 20, a light source holding section 74 that likewise projects from the plate section 71 to the optical member 20 side and holds the hot-cathode tubes 50, and a locking section 73 that projects from the plate section 71 to the bottom plate Cb1 side and is used to attach the lamp clip 70 to the bottom plate Cb1.

The circuit board 80 is also arranged on the inner surface of the wall plate Cb1 (the wall section 31). A video control board or the like for controlling a video in the television receiver TV is arranged on the inner surface. It is also possible to arrange a driving power supply board same as the driving power supply board explained above.

The piece for holding (the second member for holding) 38 for holding the reflection sheet 60 and the optical member 20 is formed in the top portion of the wall section 31. A projection (a second projection) 38a projecting to the first cabinet Ca side and a projection (a third projection, the projection for claw section regulation) 35 projecting to the first cabinet Ca side higher than the projection 38a are formed on the piece for holding 38. The piece for holding 38 holds the optical member 20 between the piece for holding 38 and the piece for holding 14 of the first cabinet Ca. In particular, the projection 38a projecting to the first cabinet Ca side is formed on the piece for holding 38. The piece for holding 38 is configured to press only the diffuser 22 in the optical member 20 at a top surface (a top) 38b of the projection (the second projection) 38a. In other words, in the reflection sheet 60 arranged further on the piece for holding 38 side than the diffuser 22, a cutout 60a having a shape that is not pressed by the projection 38a and avoids the projection 38a to detour is formed (see FIGS. 5 and 6).

On the other hand, the projection 35 regulates movement of the optical member 20 in a surface direction on the inner side of the projection 35. The projection 35 is housed in the projection housing section 18 arranged on the rear side (the outer side) of the claw section 13 of the first cabinet Ca as explained above. The projection 35 urges the claw section 13 to the liquid crystal panel 11 side (the inner side) from the rear side (the outer side).

A method of assembling the liquid crystal display device 10 according to this embodiment is explained.

First, the liquid crystal panel 11 is attached to the first cabinet Ca. In other words, the liquid crystal panel 11, which is separately manufactured, is attached to the claw section 13 of the first cabinet Ca. However, as shown in FIG. 7, the liquid crystal panel 11 is pushed against the slope 13a of the claw section 13 (in an arrow direction) from the rear side of the first cabinet Ca to elastically deform the claw section 13 in the widening direction (the outer side) and house the liquid crystal panel 11 between the locking surface 13b and the elastic member 12. When the liquid crystal panel 11 is housed between the locking surface 13b and the elastic member 12, the claw section 13 elastically returns and the liquid crystal panel 11 is prevented or suppressed from dropping from between the locking surface 13b and the elastic member 12.

Figure 8:
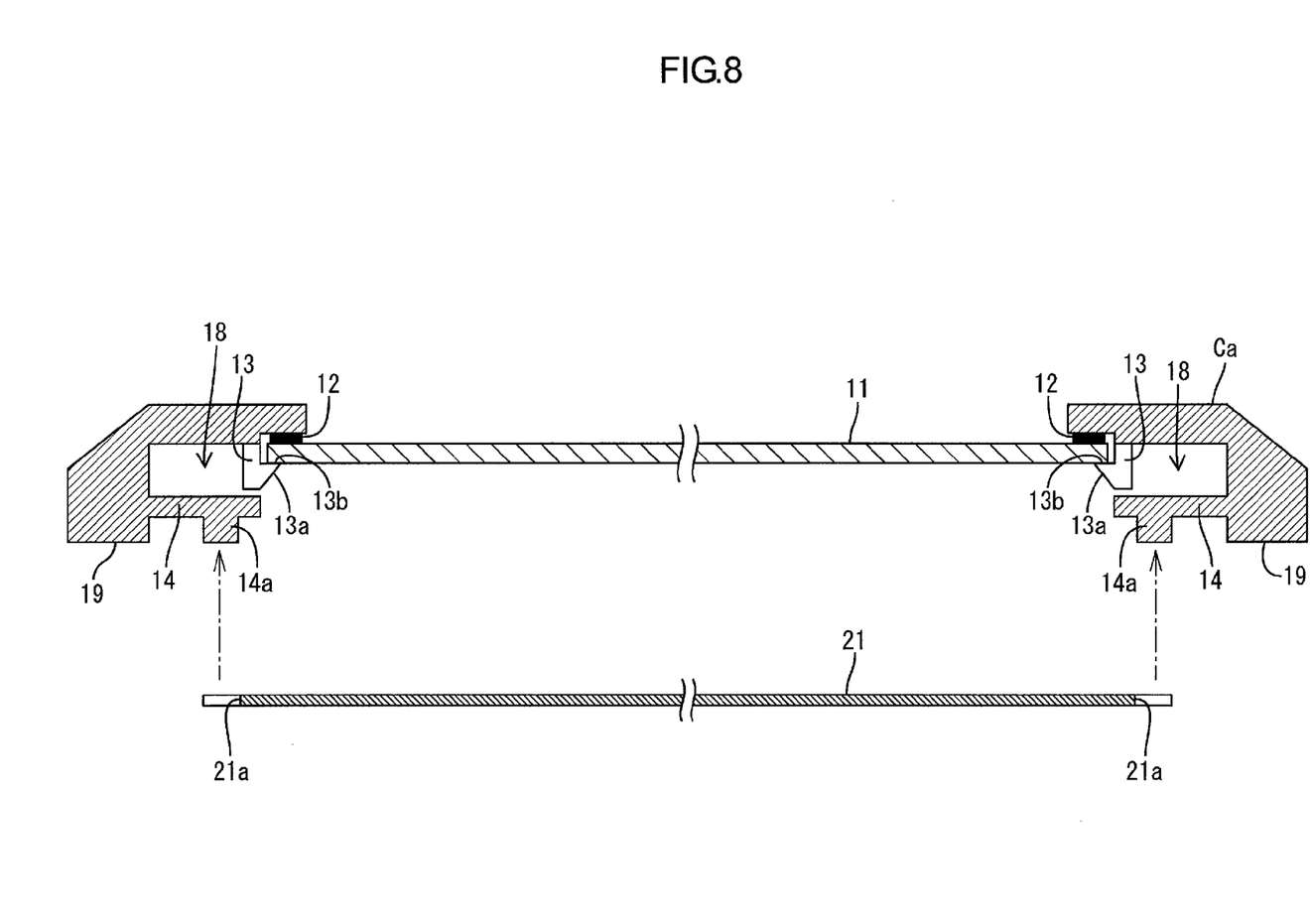
FIG. 8 is a schematic view showing a form of attaching an optical sheet to the first cabinet in the first embodiment.

As shown in FIG. 8, the optical sheet 21 is assembled to the first cabinet Ca to which the liquid crystal panel 11 is attached. The projection 14a of the piece for holding 14 of the first cabinet Ca and the cutout 21a of the optical sheet 21 are fit in with each other to assemble the optical sheet 21 and the first cabinet Ca.

Figure 9:
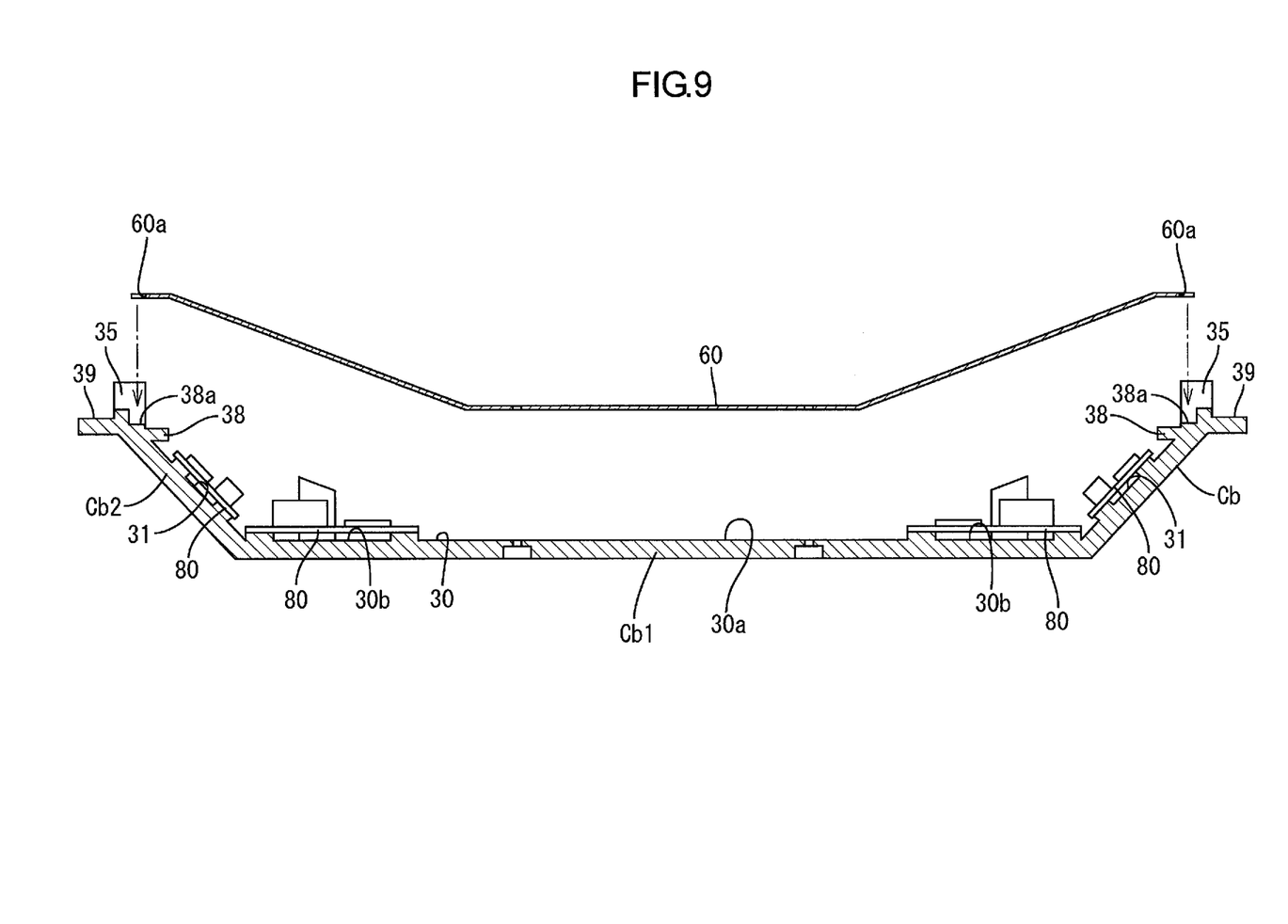
FIG. 9 is a schematic view showing a form of attaching the reflection sheet to the second cabinet in the first embodiment.

On the other hand, as shown in FIG. 9, first, the reflection sheet 60 is attached to the second cabinet Cb. The projection 38a of the piece for holding 38 of the second cabinet Cb and the cutout 60a of the reflection sheet 60 are fit in with each other to assemble the reflection sheet 60 and the second cabinet Cb.

Figure 10:
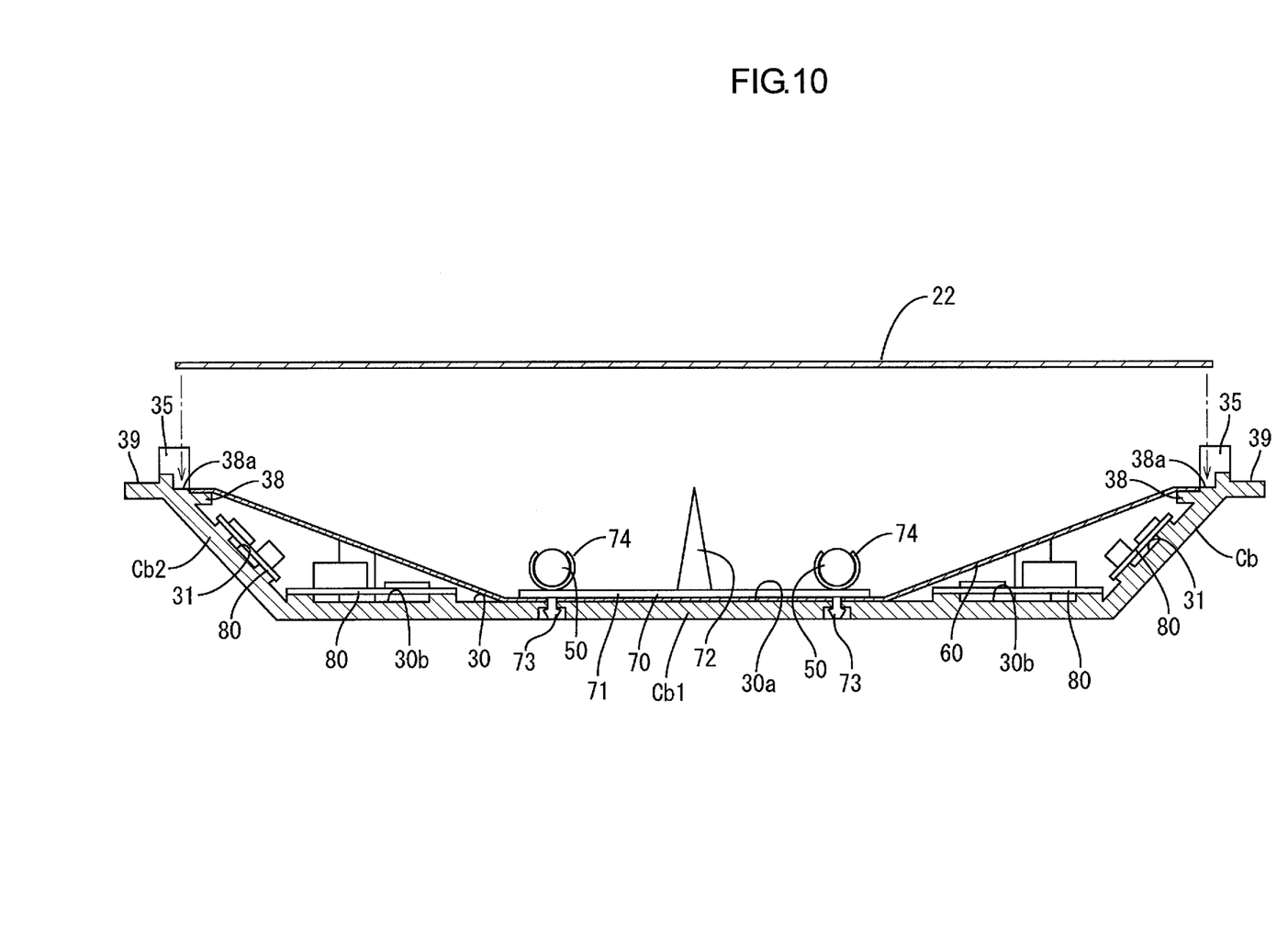
FIG. 10 is a schematic view showing a form of attaching a diffuser to the second cabinet in the first embodiment.

As shown in FIG. 10, the lamp clip 70 is attached to the second cabinet Cb to which the reflection sheet 60 is attached. The hot-cathode tubes 50 are attached to the light source holding section 74 of the lamp clip 70. Further, the diffuser 22 is arranged on the projection 38a and attached with movement in a surface direction regulated by the projection 35.

Figure 11:
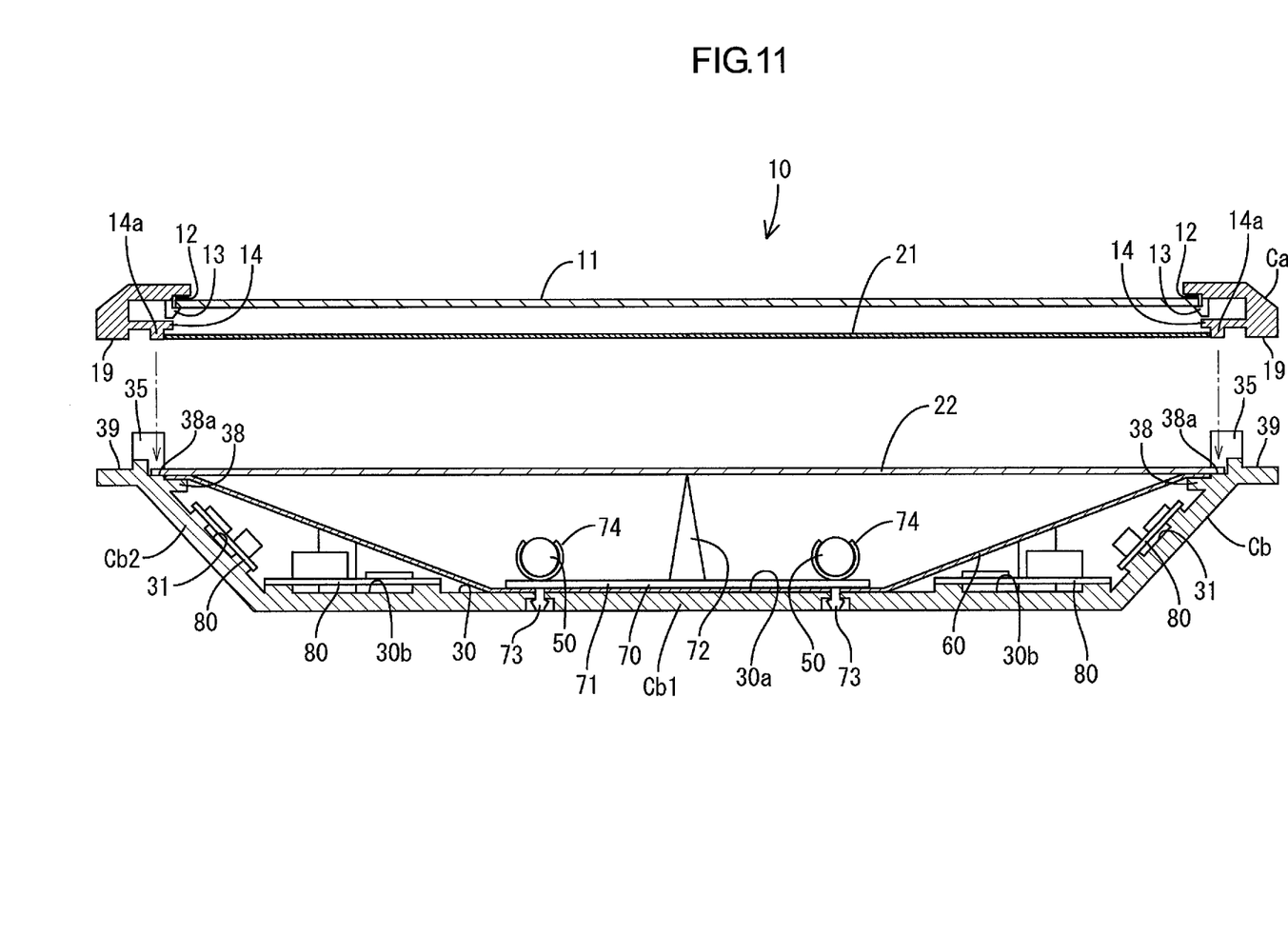
FIG. 11 is a schematic view showing a form of assembling the first cabinet and the second cabinet in the first embodiment.

As shown in FIG. 11, the first cabinet Ca and the second cabinet Cb are assembled with attaching surfaces 19 and 39 thereof opposed to each other and such that the projection 35 is housed in the projection housing section 18 of the first cabinet Ca. According to this assembling, the optical member 20 and the reflection sheet 60 are held between the piece for holding 14 of the first cabinet Ca and the piece for holding 22 of the second cabinet Cb. The diffuser 22 in the optical member 20 is held between the projection 14a and the projection 38a, i.e., pressed by the top 14b of the projection 14a and the top 38b of the projection 38a and fixed in position.

The liquid crystal display device 10 is completed according to such engagement of the first cabinet Ca and the second cabinet Cb. The liquid crystal display device 10 is supported by the stand S (see FIG. 1), whereby the television receiver TV is provided.

With the television receiver TV according to this embodiment explained above, in the liquid crystal display device 10 thereof, the liquid crystal panel 11 is attached to the first cabinet Ca and the hot-cathode tubes 50 are attached to the second cabinet Cb. Therefore, it is possible to realize a display function of the liquid crystal panel 11, which makes use of the light from the hot-cathode tubes 50, by engaging the cabinets Ca and Cb.

The first cabinet Ca and the second cabinet Cb configure the outer case that forms the exterior of the liquid crystal display device 10. Therefore, it is possible to provide the liquid crystal display device 10 as a final product such as the television receiver TV simply by engaging the first cabinet Ca and the second cabinet Cb. In particular, in this embodiment, since an attachment member such as a bezel is disused, a reduction in material cost is realized. The number of assembly processes is reduced compared with, for example, the number of assembly processes for assembling a display panel and a backlight device and then housing the display panel and the backlight device in a separate cabinet to provide a final product such as a television receiver. In this regard, a cost reduction is also realized.

Alignment of the liquid crystal panel 10 with respect to a backlight device (the second cabinet Cb) is realized by engagement of the first cabinet Ca and the second cabinet Cb. Therefore, workability of the alignment is improved. It is unnecessary to secure a region for alignment in the liquid crystal panel 11. Therefore, it is possible to easily perform the alignment without involving a situation in which an effective display region of the liquid crystal panel 11 is reduced.

The first cabinet Ca is formed in a frame shape and the display surface 11a of the liquid crystal panel 11 is arranged in the frame. Therefore, it is possible to configure the display surface 11a of the liquid crystal panel 11 and provide a final product such as a television receiver simply by engaging the first cabinet Ca and the second cabinet Cb.

Concerning the optical member 20 held between the first cabinet Ca and the second cabinet Cb, since the diffuser 22 having relatively large weight is pressed by the top 14b (the top 38b) of the projection 14a (the projection 38a) provided in the first cabinet Ca (the second cabinet Cb), a deficiency of swinging of the diffuser 22 having large weight less easily occurs. Therefore, friction between the diffuser 22 and another member due to the swing less easily occurs. Consequently, a deficiency such as scratches due to the friction less easily occurs. In particular, since the diffuser 22 is pressed by the top 14b (the top 38b) of the projection 14a (the projection 38a), an area of a pressed portion is small. Therefore, there is a degree of freedom in expansion and contraction (thermal expansion) due to heat generation from the hot-cathode tubes 50 and the like. A deficiency such as formation of creases also less easily occurs.

In the optical sheet 21, the cutout 21a is formed to avoid the projection 14a. The optical sheet 21 having relatively small weight compared with the diffuser 22 is free from expansion and contraction and the like because the optical sheet 21 is not pressed by the projection 14a. Creases are less easily formed. In particular, in this embodiment, since the thickness of the optical sheet 21 is small, creases are easily formed. However, since the cutout 21a is provided as explained above, the preventive effect could be more conspicuous. Since the optical sheet 21 avoids the projection 14a, the optical sheet 21 can swing. However, since the weight of the optical sheet 21 is small, likelihood of scratches due to friction or the like is small.

Like the optical member 20, the reflection sheet 60 is held between the first cabinet Ca and the second cabinet Cb and has the cutout 60a formed to avoid the projection 38a provided in the second cabinet Cb. Therefore, the reflection sheet 60 is held and fixed between the cabinets Ca and Cb. The projection 38a of the second cabinet Cb avoids the reflection sheet 60. The diffuser 22 is pressed by the projection 38a. Therefore, the reflection sheet 60 and the diffuser 22 are prevented from rubbing against each other with strong force. Generation of a creak due to the rubbing is prevented or suppressed.

In the first cabinet Ca, the liquid crystal panel 11 is locked by the elastically deformable claw section 13. Therefore, it is possible to attach and detach the liquid crystal panel 11 making use of elastic deformation of the claw section 13. Since the claw section 13 is elastically deformed by the projection for claw section regulation 35 of the second cabinet Cb in a direction in which force for locking the liquid crystal panel 11 is increased, the liquid crystal panel 11 is more surely locked.

In the second cabinet Cb, since the hot-cathode tubes 50 are attached to the bottom surface 30, it is possible to secure a large distance between the liquid crystal panel 11 and the hot-cathode tubes 50. Therefore, unevenness of the light emitted from the hot-cathode tubes 50 is eliminated and the light is irradiated widely over the entire surface of the liquid crystal panel 11.

In this embodiment, since the first cabinet Ca and the second cabinet Cb configure the outer case that forms the exterior of the liquid crystal display device 10, it is undesirable in design and in safety to arrange a driving power supply board for supplying driving power on the outer side of the first cabinet Ca and the second cabinet Cb. Therefore, the driving power supply board 80 is arranged on the inner side of the second cabinet Cb, to which the hot-cathode tubes 50 are attached, to eliminate problems in design and in safety and realize simplification of wires and the like related to power supply.

In the first cabinet Ca, the plural pieces for holding 14 for holding the optical member 20 are formed in the same plane. The claw section 13 is formed between the adjacent pieces for holding 14, 14 (in plan view). In the second cabinet Cb, the piece for holding 38 that holds the optical member 20 between the piece for holding 38 and the piece for holding 14 is formed. The projection 35 that urges the claw section 13 is formed. Consequently, it is possible to collectively realize locking of the liquid crystal panel 11, holding of the optical member 20, and prevention of positional deviation of the display panel by the projection. In other words, in the first cabinet Ca, since the claw section 13 that locks the liquid crystal panel 11 is formed between the adjacent pieces for holding 14, 14, the piece for holding 14 and the claw section 13 (and the projection 35) do not overlap each other. Therefore, it is possible to suitably realize locking of the liquid crystal panel 11 by the claw section 13, holding of the optical sheet by the piece for holding 14 and the piece for holding 38, and prevention of positional deviation of the liquid crystal panel 11 by the projection 35.

The second cabinet Cb includes the bottom surface 30 to which the hot-cathode tubes 50 are attached. The hot-cathode tubes 50 are localized in the region 30a in a part of the bottom surface 30. In the region 30b (including the wall section 31) different from the region 30a where the hot-cathode tubes 50 are arranged on the inner side of the second cabinet Cb, the driving power supply board 80 for supplying driving power to the hot-cathode tubes 50 is arranged. It is possible to suitably arrange the driving power supply board 80 on the inner side of the second cabinet Cb by arranging the driving power supply board 80 in the region where the hot-cathode tubes 50 are not arranged in this way.

Second Embodiment

A television receiver according to a second embodiment of the present invention is explained.

The television receiver according to the second embodiment is different from the first embodiment in a component for holding the optical member 20 and the reflection sheet 60. Since the other components are generally the same as those of the television receiver TV according to the first embodiment, explanation of the components is omitted.

Figure 12:
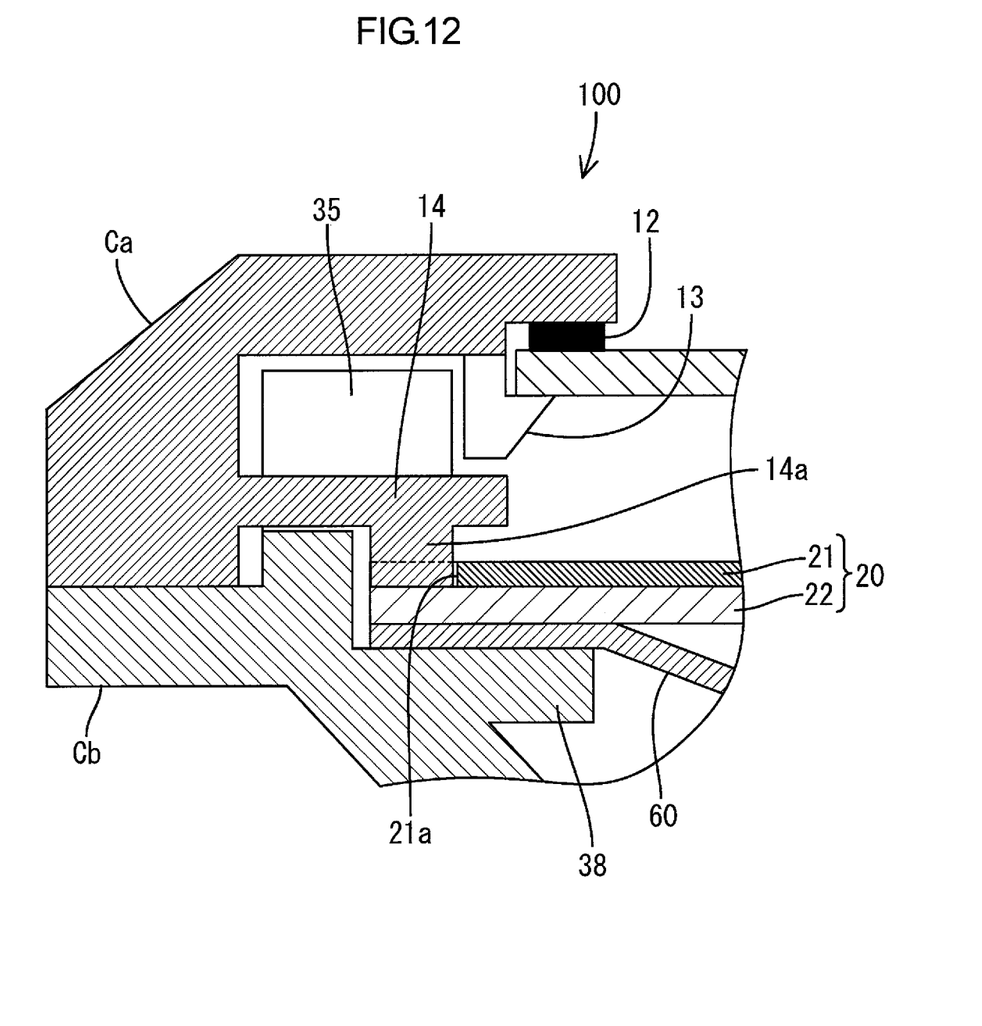
FIG. 12 is a sectional schematic view showing a main part of a liquid crystal display device according to a second embodiment in enlargement.

The television receiver TV according to the second embodiment includes a configuration in which a liquid crystal display device 100 including a main part configuration shown in FIG. 12 is supported by the stand S (see FIG. 1).

In the liquid crystal display device 100, unlike the liquid crystal display device 10 according to the first embodiment, a projection for pressing the diffuser 22 is not formed in the second cabinet Cb. Specifically, the reflection sheet 60 and the diffuser 22 are held to overlap each other between the piece for holding 38 and the projection 14a of the piece for holding 14 of the first cabinet Ca. The diffuser 22 is pressed by the top 14b of the projection 14a. Therefore, the cutout (60a) in the first embodiment is not formed in the reflection sheet 60.

Third Embodiment

A television receiver according to a third embodiment of the present invention is explained.

The television receiver according to the third embodiment is different from the first embodiment in a component for holding the diffuser 22. Since the other components are generally the same as those of the television receiver TV according to the first embodiment, explanation of the components is omitted.

Figure 13:
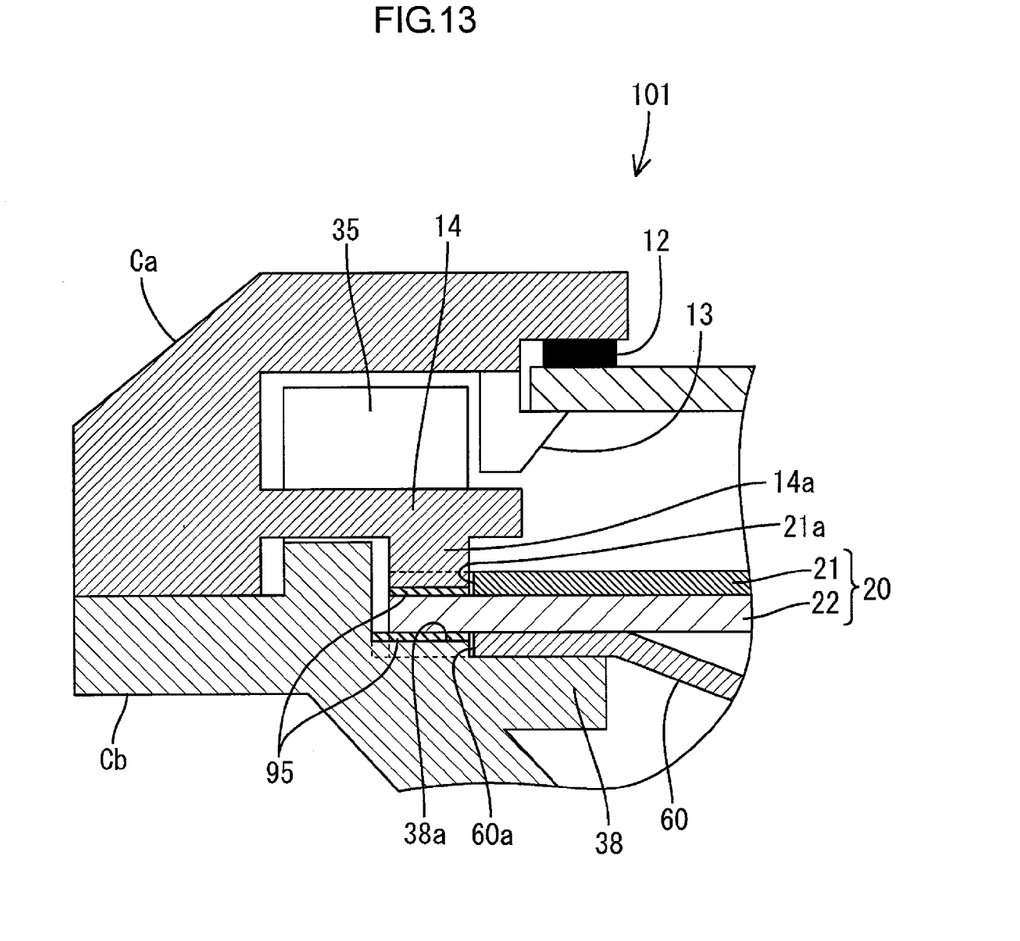
FIG. 13 is a sectional schematic view showing a main part of a liquid crystal display device according to a third embodiment in enlargement.

The television receiver TV according to the third embodiment includes a configuration in which a liquid crystal display device 101 including a main part configuration shown in FIG. 13 is supported by the stand S (see FIG. 1).

In the liquid crystal display device 101, unlike the liquid crystal display device 10 according to the first embodiment, an elastic member 95 such as PORON® is applied to the top surfaces (the tops) 14b, 38b of the projections 14a, 38a for pressing the diffuser 22. The diffuser 22 is held between the projection 14a and the projection 38a via the elastic member 95. In other words, the diffuser 22 is pressed by the top 14b (38b) of the projection 14a (38a) via the elastic member 95.

Other Embodiments

The embodiments of the present invention are explained above. However, the present invention is not limited to the embodiments explained by the description and the drawings. For example, embodiments explained below are also included in the technical scope of the present invention.

(1) In the first to third embodiments, the hot-cathode tubes 50 are used as the light source. However, it is also possible to use, for example, cold-cathode tubes as the light source.

(2) In the first to third embodiments, the two hot-cathode tubes 50 are arranged to be localized in the center region 30a of the bottom plate Cb1. However, for example, the hot-cathode tubes 50 may be arranged over the entire surface of the bottom plate Cb1. In particular, when the cold-cathode tubes are used as the light source, it is desirable to arrange the cold-cathode tubes in parallel over the entire surface of the bottom plate Cb1.

The invention claimed is:

1. A display device comprising:
a light source;
a display panel configured to provide display using light from the light source;
a first cabinet to which the display panel is attached, the first cabinet being defined by a single monolithic member;
a second cabinet to which the light source is attached, the second cabinet being defined by a single monolithic member; and
an optical member held between the first cabinet and the second cabinet, wherein
the first cabinet and the second cabinet are assembled with the optical member held therebetween,
the optical member includes a first optical member and a second optical member, the first optical member has a weight which is greater than a weight of the second optical member,
the first optical member is directly contacted by the first cabinet at a viewer side of the first optical member and directly contacted by the second cabinet at a side of the first optical member opposite from the viewer side, and
the first cabinet and the second cabinet are configured as an outer case that defines an exterior of the display device.

2. The display device according to claim 1, wherein:
the first cabinet is a frame; and
a display surface of the display panel is arranged in the frame.

3. The display device according to claim 1, wherein the first cabinet includes an elastically deformable claw section and the display panel is locked by the claw section.

4. The display device according to claim 1, wherein:
the second cabinet includes a bottom surface and a wall section vertically provided from the bottom surface; and
the light source is attached to the bottom surface.

5. The display device according to claim 1, further comprising a driving power supply board configured to supply driving power to the light source, the driving power supply board being arranged on an inner side of the second cabinet.

6. The display device according to claim 1, further comprising a driving power supply board configured to supply driving power to the light source, wherein:
the second cabinet includes a bottom surface to which the light source is attached; and
the light source is arranged in a region corresponding to a portion of the bottom surface; and
the driving power supply board is arranged in a region corresponding to a portion of the bottom surface different from the region where the light source is arranged.

7. The display device according to claim 1, wherein the display panel is a liquid crystal panel including liquid crystals.

8. A television receiver comprising the display device according to claim 1.

9. The display device according to claim 1, wherein the first cabinet includes a front portion located at the viewer side of the display panel, and the front portion is configured to cover the display panel from the viewer side of the display panel.

* * * * *